(12) United States Patent
Kobayashi

(10) Patent No.: US 7,806,587 B2
(45) Date of Patent: Oct. 5, 2010

(54) ELECTRONIC CLINICAL THERMOMETER AND METHOD OF PRODUCING THE SAME

(75) Inventor: Isamu Kobayashi, Nishitokyo (JP)

(73) Assignee: Citizen Holdings Co., Ltd., Tokyo (JP)

( * ) Notice: Subject to any disclaimer, the term of this patent is extended or adjusted under 35 U.S.C. 154(b) by 83 days.

(21) Appl. No.: 11/663,731

(22) PCT Filed: Sep. 9, 2005

(86) PCT No.: PCT/JP2005/016598

§ 371 (c)(1),
(2), (4) Date: Mar. 26, 2007

(87) PCT Pub. No.: WO2006/035585

PCT Pub. Date: Apr. 6, 2006

(65) Prior Publication Data
US 2008/0031305 A1    Feb. 7, 2008

(30) Foreign Application Priority Data
Sep. 29, 2004 (JP) ............................. 2004-283508
Sep. 29, 2004 (JP) ............................. 2004-283509

(51) Int. Cl.
    *G01K 1/00* (2006.01)
(52) U.S. Cl. ....................... 374/163; 374/208
(58) Field of Classification Search ................. 374/185, 374/208, 163
    See application file for complete search history.

(56) References Cited
U.S. PATENT DOCUMENTS
2,818,482 A * 12/1957 Bennett ..................... 338/30
4,411,535 A * 10/1983 Schwarzschild ............ 374/165
4,666,656 A *  5/1987 Bertrand .................... 376/247

(Continued)

FOREIGN PATENT DOCUMENTS
JP        62-132436 U        8/1987

(Continued)

OTHER PUBLICATIONS

International Search Report of PCT/JP2005/016598, date of mailing Dec. 13, 2005.

(Continued)

*Primary Examiner*—Lisa M Caputo
*Assistant Examiner*—Mirellys Jagan
(74) *Attorney, Agent, or Firm*—Westerman, Hattori, Daniels & Adrian, LLP

(57) ABSTRACT

A method of producing an electronic clinical thermometer is disclosed, the electronic clinical thermometer including a temperature-sensitive element, lead wire that is connected to the temperature-sensitive element, a body case having a probe part in which an insertion path for the lead wire to be inserted is formed, and a sensor cap having a cavity one end of which is opened and the other end is closed, both the lead wire projecting from the insertion path and the temperature-sensitive element being stored within the sensor cap, and the method includes a step for mounting the sensor cap on the probe part, in a state where the lead wire having the temperature-sensitive element mounted on the tip thereof projects from the insertion path of the probe part.

9 Claims, 21 Drawing Sheets

U.S. PATENT DOCUMENTS

| | | |
|---|---|---|
| 5,165,798 A | 11/1992 | Watanabe |
| 6,338,571 B1* | 1/2002 | Chen .......................... 374/208 |
| 6,676,290 B1* | 1/2004 | Lu ............................. 374/163 |
| 2003/0128738 A1* | 7/2003 | Chen .......................... 374/185 |
| 2004/0066836 A1* | 4/2004 | Chen .......................... 374/163 |
| 2004/0071190 A1* | 4/2004 | Chang ........................ 374/185 |
| 2004/0161017 A1* | 8/2004 | Chang et al. ................ 374/208 |
| 2005/0094707 A1* | 5/2005 | Lee et al. ................... 374/163 |
| 2005/0117626 A1* | 6/2005 | Kobayashi et al. .......... 374/163 |
| 2005/0123022 A1* | 6/2005 | Yu et al. ..................... 374/163 |
| 2006/0039446 A1* | 2/2006 | Lee ............................ 374/208 |
| 2007/0014330 A1* | 1/2007 | Hsieh ........................ 374/208 |
| 2009/0147825 A1* | 6/2009 | Ho et al. .................... 374/185 |
| 2010/0014557 A1* | 1/2010 | Tomioka et al. ............ 374/163 |

FOREIGN PATENT DOCUMENTS

| | | |
|---|---|---|
| JP | 62-170537 U | 10/1987 |
| JP | 1-312432 A | 12/1989 |
| JP | 2527557 Y2 | 3/1997 |
| JP | 3087305 U | 5/2002 |
| JP | 3087305 U | 8/2002 |
| JP | 3094041 U | 5/2003 |
| JP | 3096508 U | 9/2003 |
| JP | 2004-219123 A | 8/2004 |

OTHER PUBLICATIONS

Japanese Office Action dated Jun. 15, 2010, issued in corresponding Japanese Patent Application No. 2004-283508.

Japanese Office Action dated Jun. 15, 2010, issued in corresponding Japanese Patent Application No. 2004-283509.

* cited by examiner

ELECTRONIC CLINICAL THERMOMETER AND METHOD OF PRODUCING THE SAME

FIELD OF THE INVENTION

The present invention relates to an electronic clinical thermometer and a method of producing the same.

BACKGROUND OF ART

An electronic clinical thermometer, wide-spreading currently, includes a button type battery as a power source and a probe that is brought into contact with axillar or a part under the tongue, so as to detect a change in resistance of temperature-sensitive element (thermistor) placed in the probe, convert the detected value into a temperature value, and display the temperature on a liquid crystal display (LCD), and this type of electronic clinical thermometer is commonly used. This type of electronic clinical thermometer incorporates in a plastic case, a power source battery, a measurement circuit, an LCD, an operating switch, and the like. The probe is formed on one end of the electronic clinical thermometer body, and the probe includes a probe body in which an insertion path for inserting a lead wire connected to the thermistor, and a sensor cap mounted on the probe body. The thermistor is disposed on the inner wall of the sensor cap in such a manner as being in contact therewith, and held on the inner wall with an adhesive filled therein. Such electronic clinical thermometer configured as described above has been proposed so far.

[Patent document 1]
Japanese Registered Utility Model No. 3096508 (Page 9, FIG. 3)

[Patent document 2]
Japanese Unexamined Utility Model Application Publication No. 62-132436 (Pages 3 to 4, FIG. 1)

[Patent document 3]
Japanese Registered Utility Model No. 3094041 (Pages 5 to 6, FIG. 3 and FIG. 4)

[Patent document 4]
Japanese Unexamined Utility Model Application Publication No. 62-170537 (Pages 1 to 4, FIG. 1 to FIG. 3)

As shown in FIG. 15, the electronic clinical thermometer disclosed in the patent document 1 has a temperature probe 31 that includes a probe body 32, and a sensor cap 33 provided with a hollow end that is fastened to the probe body 32. This sensor cap 33 includes a thermal contact surface 33a and a cavity 33b surrounded by the thermal contact surface 33a. The thermistor 34 is fastened to a location of an inner tip 33c of the thermal contact surface 33a of the sensor cap 33. A pair of the lead wire 35 is connected to the thermistor 34 and transmits a temperature signal.

This lead wire 35 includes a part 35a that is fastened to the inside of the thermal contact surface 33a of the sensor cap 33. The leadwire 35 in proximity to the thermistor 34 is not in contact with the inner wall 33c of the sensor cap 33. An intermediate part positioned at a distance from the vicinity of the thermistor 34 is brought into contact with the thermal contact surface 33a of the sensor cap 33.

As shown in FIG. 16, a thermometer probe 41 of the electronic clinical thermometer disclosed in the patent document 2 is configured such that a sensor cap 43 fits into a tip of a tubular probe body 42, and a thermistor 44 is embedded in an adhesive 46 that is encapsulated in the tip of this sensor cap 43. The tip of the thermistor 44 abuts against the inner side of the sensor cap 43.

Lead wire 45 from the thermistor 43 is guided to the probe body 42 side along the inner wall of the sensor cap 43 with the adhesive 46. A part of the adhesive 46 is extended towards the probe body 42 side in a shape of sleeve along the inner wall of the sensor cap 43, and the adhesive 46 is fastened to the inner wall of the sensor cap 43.

With the probe in the electronic clinical thermometer as described above, the heat transferred from a measured part to the sensor cap is further transferred from the sensor cap to the lead wire, and the heat transferred to the thermistor is prevented from being liberated through the lead wire.

As shown in FIG. 17 and FIG. 18, in the electronic clinical thermometer disclosed in the patent document 3, a thermistor 54 and lead wire 55 are disposed inside the sensor cap 53. The thermistor 54 is fixed onto an inner wall of the tip of the sensor cap 53 with an adhesive 56.

One end of the lead wire 55 is connected to the thermistor 54, and the other end is connected to an IC within a case outside the electronic clinical thermometer, not illustrated. A sensor cap 53 is filled with a heat insulator 57 that hardly transmits heat, and the thermistor 54 and the lead wire 55 are fixed securely within the sensor cap 53.

As described above, since the sensor cap is filled with the heat insulator, the entire lead wire within the sensor cap, including a part in proximity to the thermistor, is attached firmly to the inner wall of the sensor cap cavity.

The patent document 4 discloses two electronic clinical thermometers. One of them is shown in FIG. 19 and FIG. 20. In this clinical thermometer, there is formed a locking hook 61a that locks the lead wire 63 connected to the thermistor 62 on the tip of the probe 61, so as to adjust a position of the lead wire in the middle position, the probe 61 storing a circuit board 60 on which circuit components for temperature measurement are implemented, and the locking hook 61a is integrally formed with the probe 61.

This locking hook 61a is formed so that the thermistor 62 abuts against the inner bottom surface of the sensor cap 64 when the sensor cap 64 fits into the probe 61. The thermistor 62 is connected to the lead wire, and fastened to the inner bottom surface of the sensor cap 64 with an adhesive 66. Reference numeral 67 indicates a battery and reference numeral 65 indicates a battery cover.

FIG. 21 shows the other electronic clinical thermometer, and it has the same configuration as the electronic clinical thermometer as shown in FIG. 19 and FIG. 20, except that the lead wire 63 of the thermistor 62 is not locked within the sensor cap 64. The patent document 4 describes a method of producing those electronic clinical thermometers as described above.

In assembling the electronic clinical thermometer as shown in FIG. 19 and FIG. 20, the lead wire 63 of the thermistor 62 is firstly connected to the circuit of the circuit board 60. Subsequently, in the state where the battery 67 and the battery cover 65 positioned in the rear of the probe 61 are removed, the thermistor 62 and the circuit board 60 are inserted from the rear of the probe 61, and the lead wire 63 of the thermistor 62 that appears in the front side of the probe 61 is locked on the locking hook 61a. Then, the front side of the probe 61 is fixed on the sensor cap 64 in which a little amount of adhesive 66 is injected. The probe 61 and the sensor cap 64 are fastened to each other with the adhesive 66. The thermistor 62 comes into contact with the inner bottom surface of the sensor cap 63 and fixed thereon.

In the electronic clinical thermometer as shown in FIG. 21, the lead wire 63 of the thermistor 62 is firstly connected to the circuit board 60, and subsequently, these elements are inserted from the rear of the probe 61. The thermistor 62 is brought into contact with the inner wall surface of the sensor cap 64, and fastened thereto with the adhesive 66.

In the electronic clinical thermometers as described in the patent document 1 and the patent document 2, the lead wire in proximity to the thermistor does not come into contact with the sensor cap. Therefore, there has been a problem that the heat on the thermistor escapes towards the non-contact lead wire, whereby a rise in temperature becomes slower and longer time is necessary for measurement.

In the electronic clinical thermometer as described in the patent document 3, the thermistor to which the lead wire is connected is firstly fixed on the inner wall of the tip of the sensor cap with an adhesive, and thereafter the heat insulator is put within the sensor cap. When the heat insulator is inserted in a state where the lead wire is freely movable, the lead wire may be pressed down towards the inner wall of the sensor cap by the outer surface of the heat insulator, and the lead wire may be dragged and drawn into the sensor cap more than necessary.

If the heat insulator is inserted while a part of the lead wire that projects outwardly from the sensor cap is fixed, to avoid the lead wire from being drawn into the sensor cap, a tensile force is generated on the lead wire and a stress is concentrated at least on a portion of the lead wire between the thermistor and the fixed portion. Therefore, there is a possibility that the lead wire may be broken.

With the structure of the electronic clinical thermometer and a method of producing the same as described in the above patent document 4, it is not possible to firmly attach the lead wire onto the inner wall of the sensor cap. Therefore, there has been a problem that a desired high-speed electronic clinical thermometer cannot be produced.

The present invention has been made to address the disadvantages as described above, and an object of the present invention is to provide an electronic clinical thermometer that can be produced without breaking the lead wire and also effectively prevent dissipation of heat from the thermistor to the lead wire, and further to provide a method of producing this electronic clinical thermometer.

DISCLOSURE OF THE INVENTION

In order to achieve the above object, the present invention is directed to a method of producing an electronic clinical thermometer that includes a temperature-sensitive element, lead wire that is connected to the temperature-sensitive element, a body case having a probe part in which an insertion path for the lead wire to be inserted is formed, and a sensor cap having a cavity one end of which is opened and the other end is closed, both the lead wire projecting from the insertion path and the temperature-sensitive element being stored within the sensor cap, the method including a sensor cap mounting step that mounts the sensor cap on the probe part, in a state where the lead wire having the temperature-sensitive element mounted on the tip thereof projects from the insertion path of the probe part.

In the sensor cap mounting step, a projecting length of the lead wire is set to be longer than a distance between the tip of the probe part and the tip of the inner wall of the cavity, when the sensor cap is mounted on the probe part.

The projecting length of the lead wire is set to be a length that may allow the lead wire near the temperature-sensitive element to come into contact with the inner wall of the cavity, when the sensor cap is mounted on the probe part.

The electronic clinical thermometer further includes a circuit board connected to the lead wire, and the method of producing the electronic clinical thermometer is provided with a temperature-sensitive element mounting step that mounts the temperature-sensitive element on the lead wire, a connecting step that connects the lead wire with the circuit board, and an incorporating step that incorporates the circuit board into the body case. Those steps above may be implemented in the order of the following; the mounting step, the connecting step, and the incorporating step. Alternatively, the steps may be carried out in reverse order.

It is further possible to provide a step to fill an area near the closed end in the sensor cap with an adhesive. The step of filling with the adhesive can be carried out prior to mounting the sensor cap on the probe part.

In the step of filling with the adhesive, an amount of the adhesive used for the filling may correspond to the amount being required for fastening only the temperature-sensitive element and the lead wire near the temperature-sensitive element.

In the sensor cap mounting step to mount the sensor cap on the probe part, the temperature-sensitive element is configured to move rotationally, when the inner wall of the closed end of the cavity is pressed against the temperature-sensitive element.

The sensor cap mounting step to mount the sensor cap on the probe part can be carried out in a state where at least a part of the lead wire other than the projecting part thereof is fixed.

The cavity may have the tip to be formed in an almost hemispherical shape or in an almost half-oval-spherical shape, against which the temperature-sensitive element abuts.

The electronic clinical thermometer of the present invention includes a temperature-sensitive element, lead wire being connected with the temperature-sensitive element, and a probe part to store these elements, and the electronic clinical thermometer senses a body temperature by the temperature-sensitive element. The probe part includes a probe body in which an insertion path to insert the lead wire is formed, and a sensor cap to be mounted on the probe body.

This sensor cap is provided with a cavity. In this cavity, the lead wire includes a contact part being in contact with the inner wall of the cavity, near the temperature-sensitive element within the cavity, and a non-fastened part that is fastened neither to the sensor cap nor to the probe body, in a portion from the temperature-sensitive element to the insertion path.

The temperature-sensitive element is fastened to the inner wall of the cavity in such a manner as being in contact therewith. In addition, the temperature-sensitive element is mounted on the tip of the lead wire that projects from the insertion path.

The cavity around the tip thereof is formed in an almost hemispherical shape or in an almost half-oval-spherical shape. The temperature-sensitive element is placed in this almost hemispherical shaped part or in this almost half-oval-spherical shaped part of the cavity, and the temperature-sensitive element is brought into contact with the almost hemispherical shaped part or the almost half-oval-spherical shaped part, and fastened thereto.

The almost hemispherical shaped part or the almost half-oval-spherical shaped part is filled with an adhesive, and this adhesive fastens at least the temperature-sensitive element. The adhesive may further fasten the lead wire near the temperature-sensitive element.

BEST MODE FOR CARRYING OUT THE INVENTION

Hereinafter, with reference to the accompanying drawings, an electronic clinical thermometer and a method of producing the same according to a preferred embodiment of the present invention will be explained.

Figure 1:
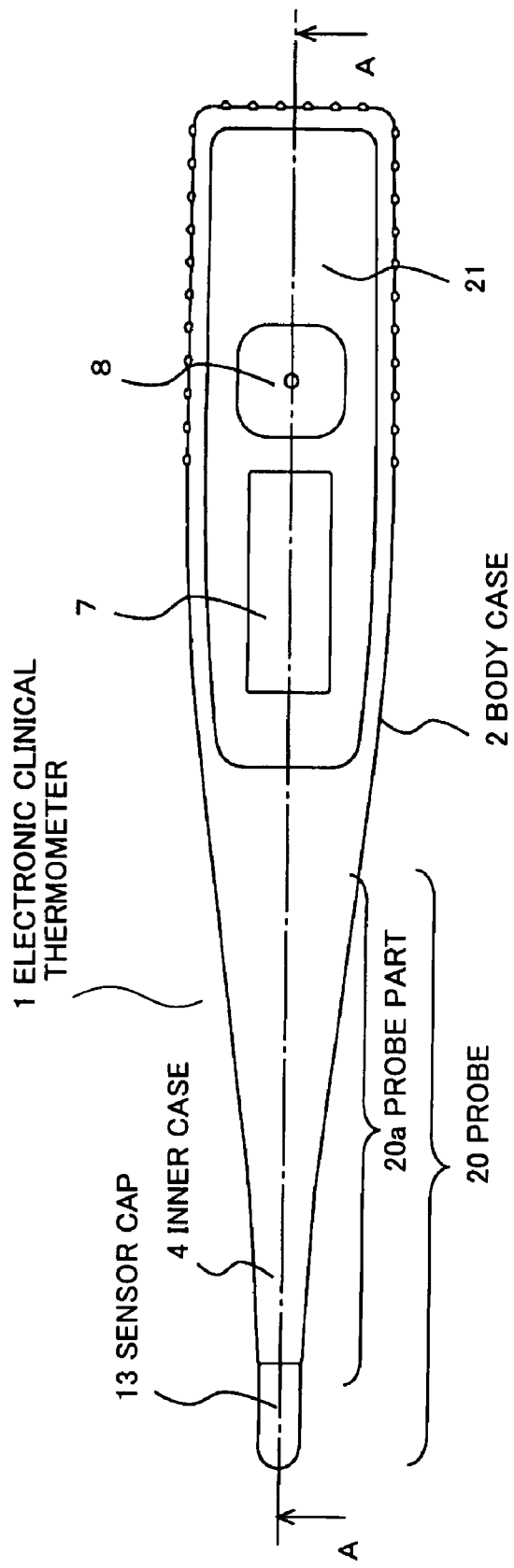
FIG. 1 is an external view of an electronic clinical thermometer according to the present invention.
Figure 2:
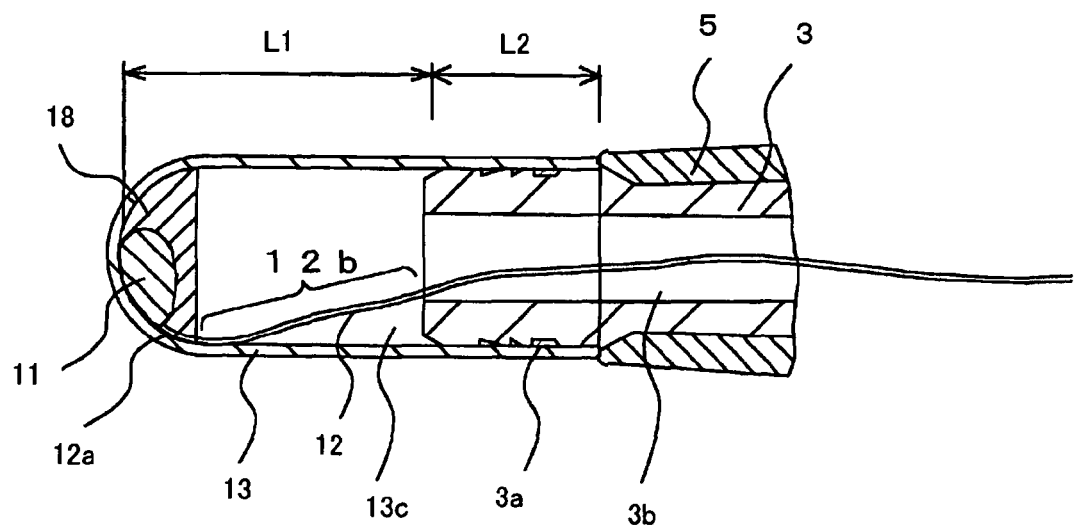
FIG. 2 is a partial cross sectional view of a probe part in the electronic clinical thermometer as shown in FIG. 1.
Figure 3:
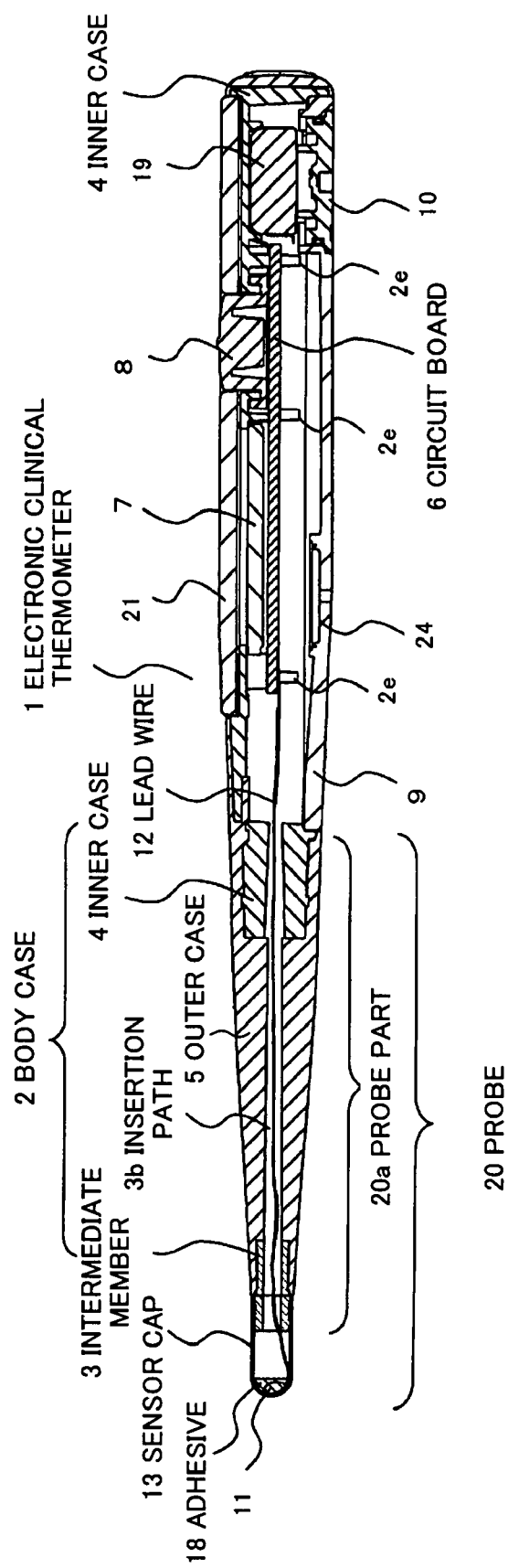
FIG. 3 is a cross sectional view of the electronic clinical thermometer taken along the line A-A of FIG. 1.
Figure 4:
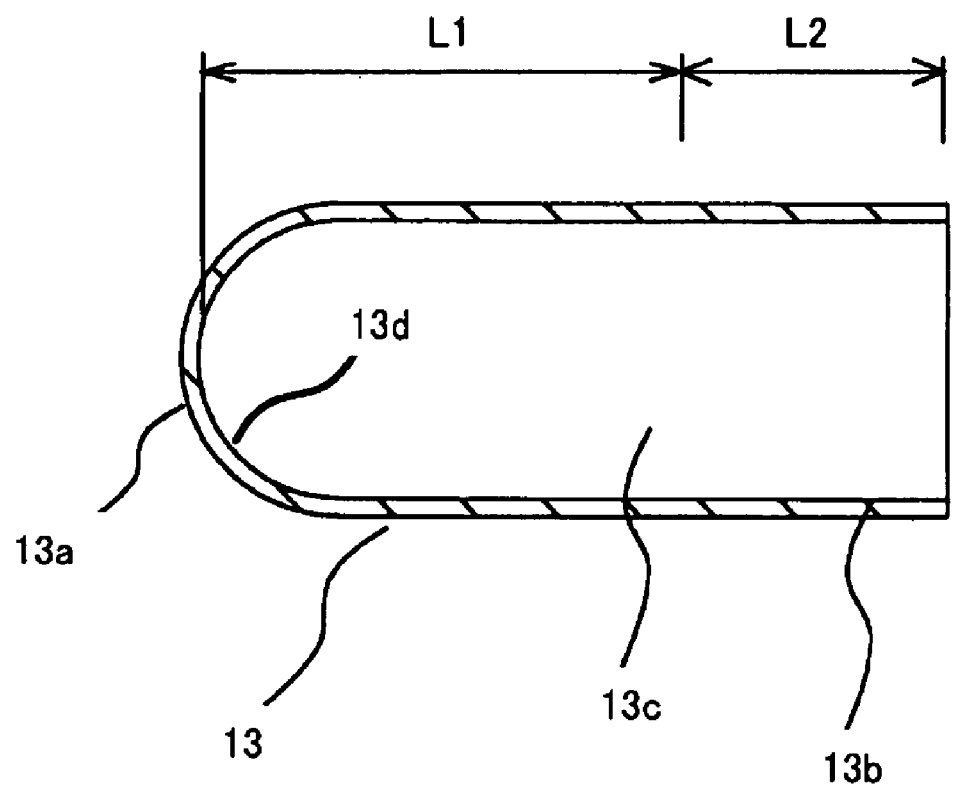
FIG. 4 is a cross sectional view of a sensor cap as shown in FIG. 1.

FIG. 1 to FIG. 5 relate to an embodiment of the present invention. FIG. 1 is an external view of an electronic clinical thermometer according to the present invention; FIG. 2 is a partial cross sectional view of a probe part in the electronic clinical thermometer as shown in FIG. 1; FIG. 3 is a cross sectional view of the electronic clinical thermometer taken along the line A-A of FIG. 1; FIG. 4 is a cross sectional view of a sensor cap; and FIG. 5 includes external views each showing a thermistor to which lead wire is connected.

In FIG. 1 to FIG. 3, the electronic clinical thermometer 1 according to the present embodiment includes a body case 2. This body case 2 is formed by integrally molding components according to a method and the like described below, the components including a flexible outer case 5 made of thermoplastic elastomer and the like, an intermediate member 3 made of ABS resin and the like, and an inner case 4.

On end of the inner case 4 is connected to one end of the outer case 5, and the other end of the inner case 4 extends up to one end of the electronic clinical thermometer 1. The inner case 4 and the outer case incorporate a power source battery 19, a circuit board 6, an LCD 7, an operating switch 8, and the like. An acrylic front panel 21 is mounted on the body case 2, and a battery cover 10 is mounted at a position of the power battery 19.

The intermediate member 3, a part of the outer case 5 on the intermediate member 3 side, and a part of the inner case 4 on the intermediate member 3 side constitute the probe part 20a.

Columnar convex parts 2e molded in the inner case 4 are inserted into mounting holes of the circuit board 6, not illustrated, and the circuit board 6 is fixed thereon by crimping the columnar convex parts 2e. A lower case 9 is fastened to the main body 2. A buzzer 24 is mounted on the lower case 9.

A thermistor 11 is installed on the front edge position of the probe 20. The thermistor 11 is connected to the lead wire 12 that is further connected to the circuit board 6. A sensor cap 13 is fastened to the tip of the intermediate member 3. The sensor cap 13 is formed by drawing a material having a high thermal conductivity, such as a stainless material, for instance. Fastening of the sensor cap 13 to the intermediate member 3 is carried out by injecting an epoxy adhesive or the like into a concave part 3a formed on the outer wall surface on the tip of the intermediate member 3, and then inserting the intermediate member into the tube of the sensor cap 13. In addition, fastening of the sensor cap 13 to the intermediate member 3 may use another adhering means other than the adhesive and the like. The probe 20 includes the probe body 20a and the sensor cap 13.

A material of the outer case 5 is rendered flexible by using a thermoplastic elastomer material, and the probe part 20a is deformed according to a shape of the part targeted for temperature measurement of a living body. The probe part is attached firmly to the targeted part, thereby facilitating the measurement.

This thermoplastic elastomer has a poor adhesivity with a metal. Therefore, the metallic sensor cap 13 is not directly adhered to the outer case 5 made of the thermoplastic elastomer material. Instead, the intermediate member 3 having a good adhesivity with both the thermoplastic elastomer material and metallic member is integrally molded on the outer case 5, and the sensor cap 13 is adhered to this intermediate member 3. As a material of the intermediate member 3, hard resins such as ABS resins, PP resins, PE resins, and PC resins can be employed. If the probe 20 does not require flexibility, the probe part 20a may be made of only hard resins such as ABS resins.

The two types of materials, thermoplastic elastomer and hard resin, may be integrally molded according to the following procedure, for instance.

Firstly, a hard resin material is supplied in a molding die, and the inner case 4 and the intermediate member 3 are molded independently. Subsequently, these molded components are transferred into a cavity of another die, and a remaining part of the cavity is filled with the elastomer resin. In the process of filling, at least the elastomeric resin material, being in a state of melted, comes into contact with the surfaces of the molded components within the molding die. Consequently, the two materials (the hard resin material and elastomeric resin) are joined firmly, and a predetermined shape is integrally molded as a whole.

As shown in FIG. 2 to FIG. 5, an insertion path 3b is formed in the probe part 20a. The intermediate member 3 the outer case 5 and the inner case 4 constituting the probe part 20a respectively form insertion paths therein, and the insertion paths of these components are linked to establish one insertion path 3b. Lead wire 12 connected to the thermistor 11 is inserted in this insertion path 3b.

With reference to FIG. 4, the sensor cap will be explained. The sensor cap 13 is made up of a hemisphere part 13a having a tip formed in almost hemispherical shape or almost half-oval-spherical shape, and a cylindrical part 13b. The sensor cap 13 forms a hollow 13c inside the hemisphere part 13a and the cylindrical part 13b. One side of the hollow 13c is closed by the hemisphere part 13a, and the other side is open by the opening of the cylindrical part 13b.

The length of this hollow 13c is equal to "L1+L2" in the sensor cap 13 as one unit. Here, "L2" indicates the length how long the intermediate member 3 is inserted in the hollow 13c. In FIG. 2, the length L2 corresponds to the length how long one end of the intermediate member 3 projects from the outer case 5. In the state where the sensor cap 13 is attached to the intermediate member 3, the projecting end of the intermediate member 3 enters into the cavity 13c up to the length L2. Therefore, the length L1 corresponds to the length from the end of projection of the intermediate member 3 up to the inner wall 13d of the hemisphere part 13a of the sensor cap 13.

FIG. 5(a) is a top view showing the state where the lead wire 12 is connected to the thermistor 11, and FIG. 5(b) is a side view of FIG. 5(a). Two lines of lead wire 12 are connected to the thermistor 11. One end of the lead wire 12 is connected to the thermistor 11, and the other end is connected to the circuit board 6.

The thermistor 11 is provided with a chip-shaped device not illustrated. This device is provided with two electrode parts. One end of the lead wire 12 is soldered to the electrode parts and an area outside of the joint is covered by an insulating coating of epoxide resin or the like.

Coating of epoxide resin or the like also covers a part of the lead wire 12 excluding both ends that are soldered to the chip shaped device in the thermistor 11 and the circuit board 6, respectively. As described above, one end of the thermistor 11 is connected to the lead wire 12. The other end of the thermistor 11, being opposite to the side connected to the lead wire 12, has a rounded and almost spherical shape, and this shape facilitates rotational movement, when this end abuts against the inner wall of the sensor cap 13.

Figure 13:
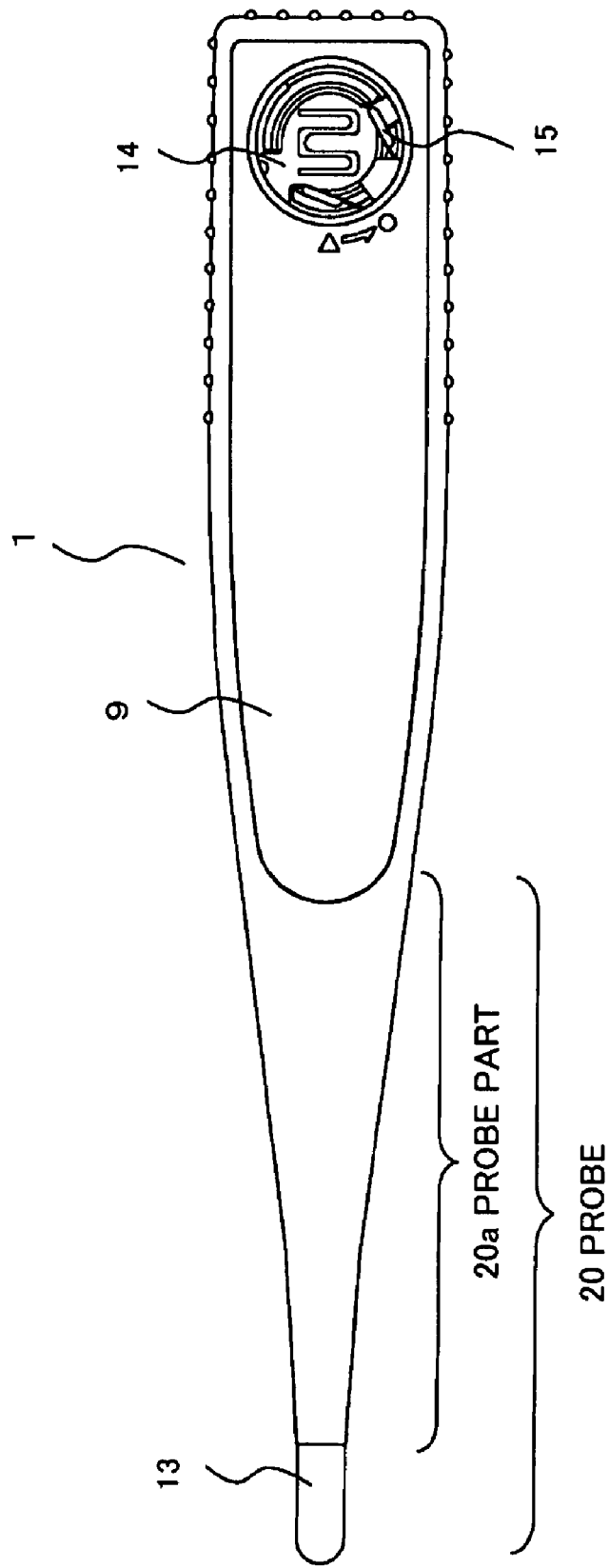
FIG. 13 is an illustration showing a process for mounting a lower case on the probe body.
Figure 14:
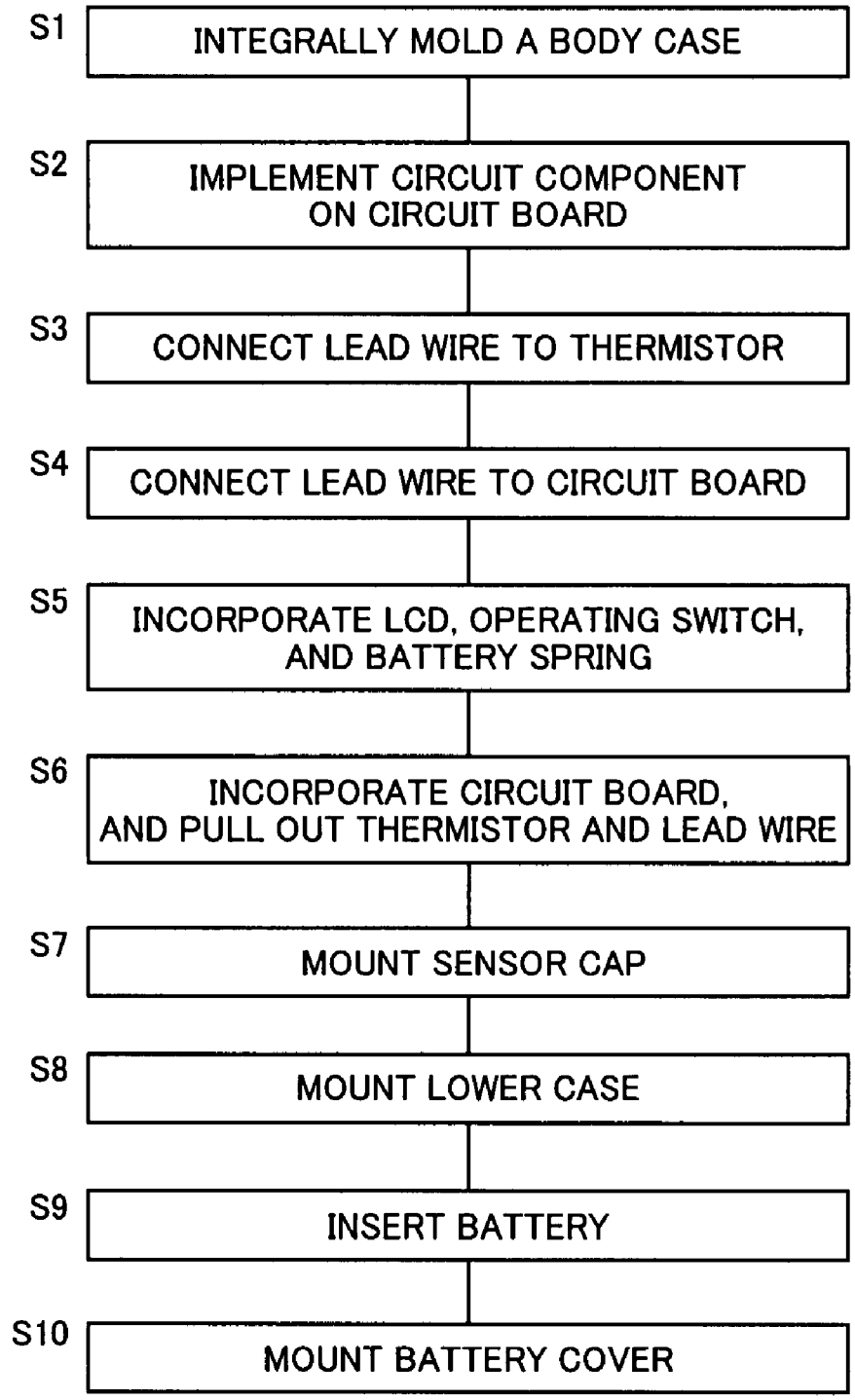
FIG. 14 is a flow chart to explain an assembling process.
Figure 15:
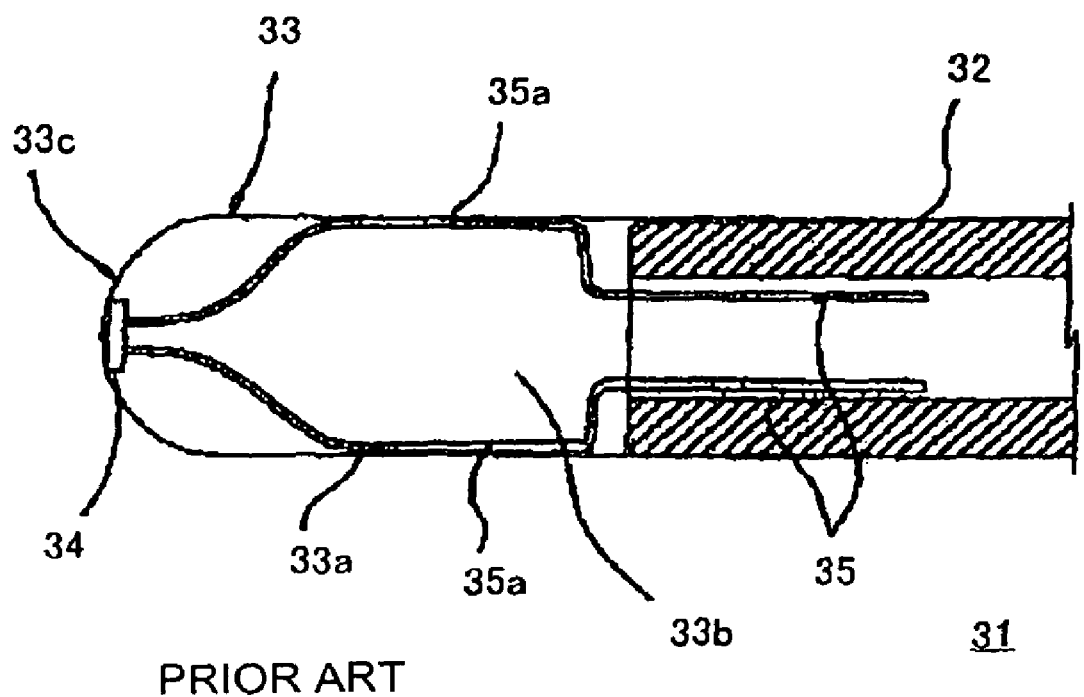
FIG. 15 is a cross sectional view of a conventional electronic clinical thermometer.
Figure 16:
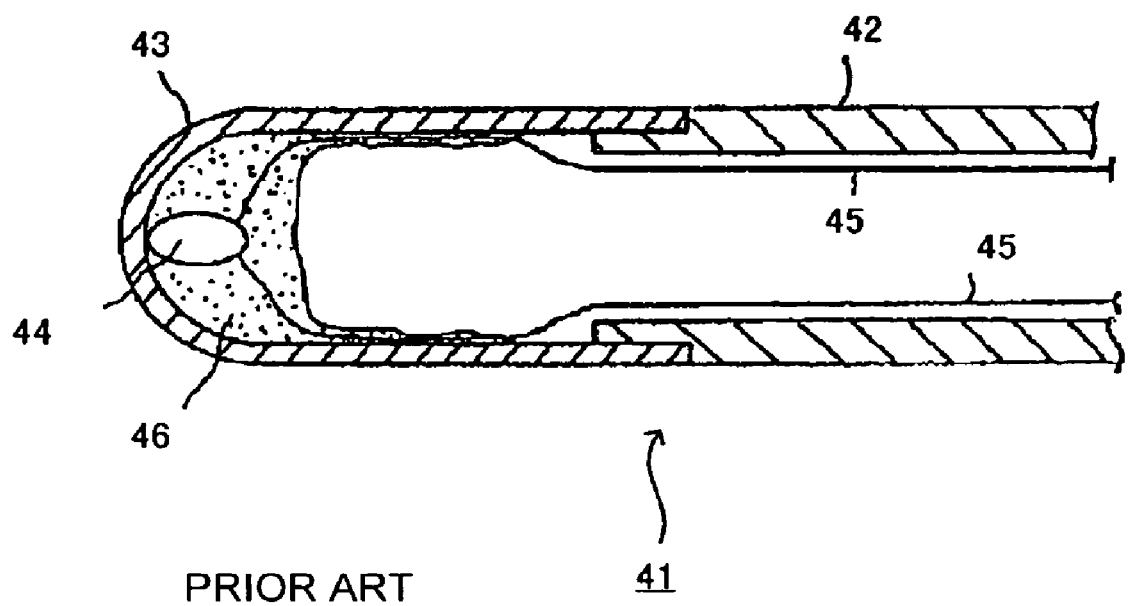
FIG. 16 is a partial cross sectional view of the probe part in the conventional electronic clinical thermometer.
Figure 17:
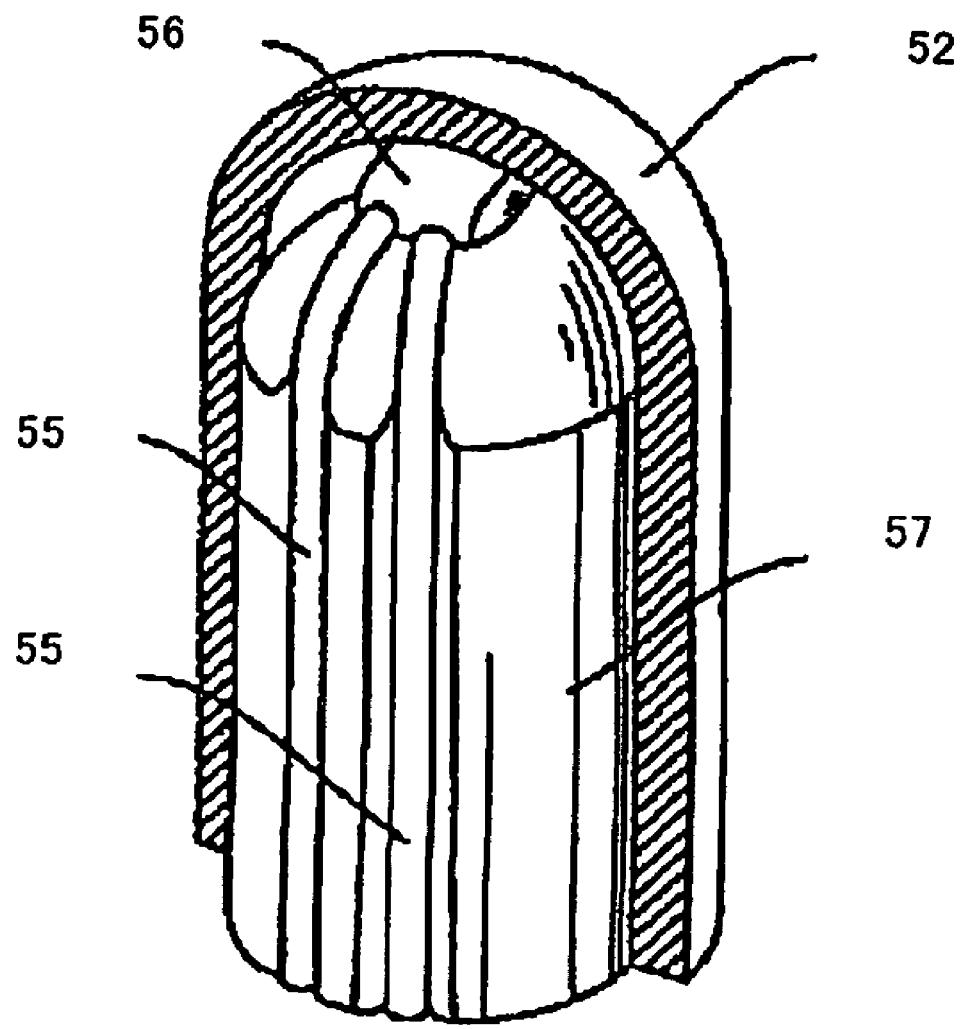
FIG. 17 is a partially cutout perspective view of the probe part in the conventional electronic clinical thermometer.
Figure 18:
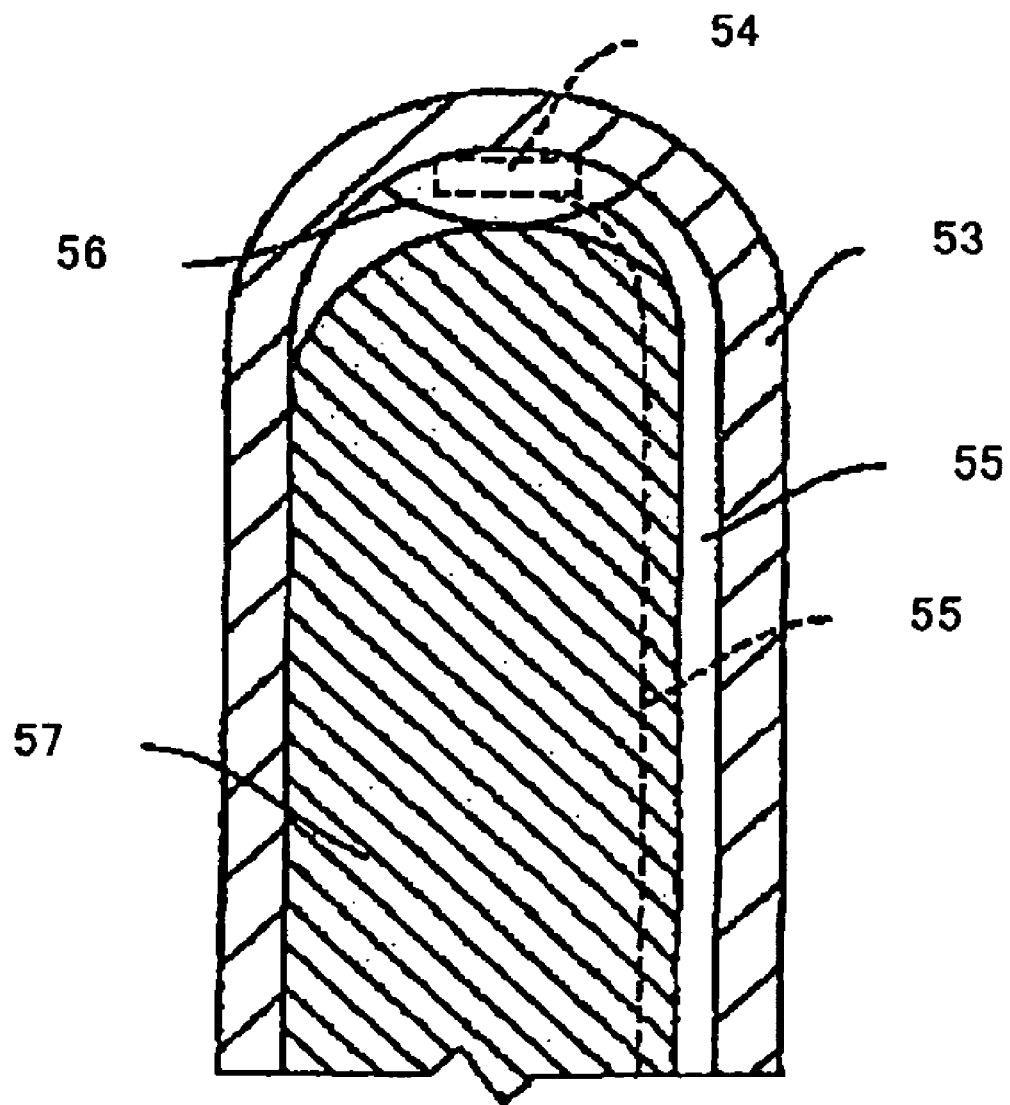
FIG. 18 is a partial cross sectional view of the probe part as shown in FIG. 17.
Figure 19:
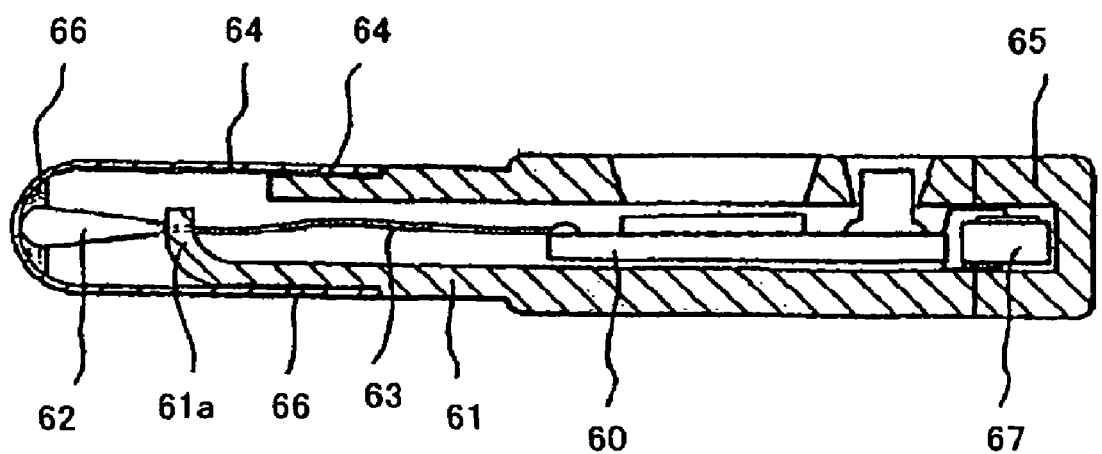
FIG. 19 is a partial enlarged perspective view of another conventional electronic clinical thermometer.
Figure 20:
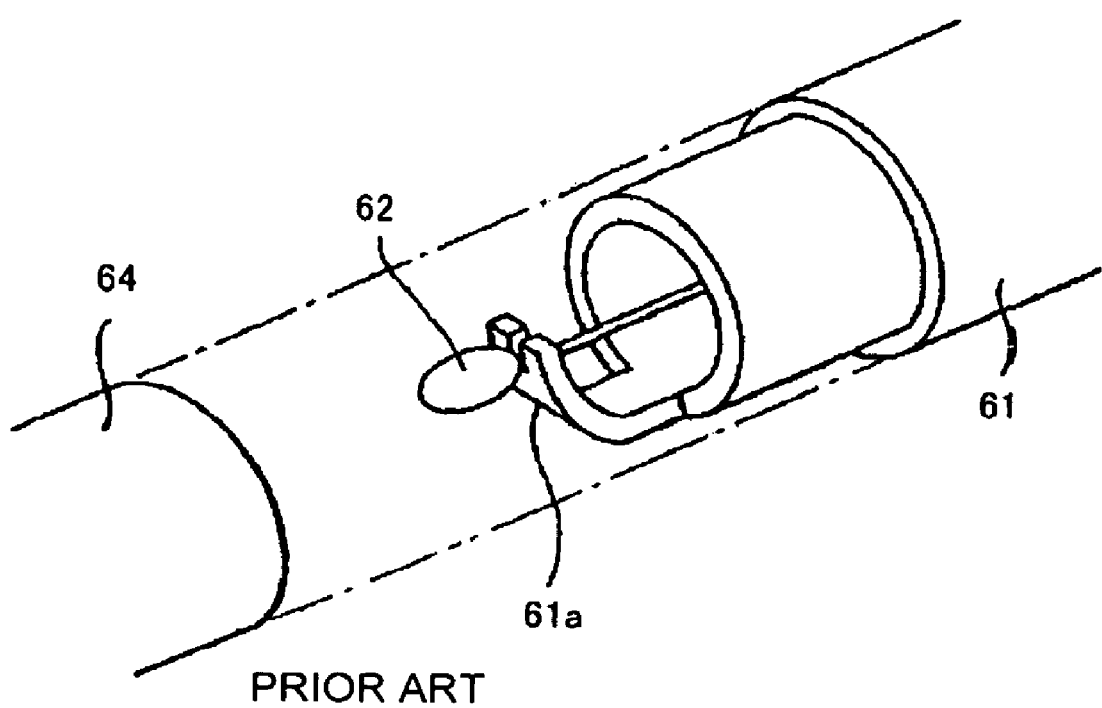
FIG. 20 is a partial enlarged perspective view of the electronic clinical thermometer as shown in FIG. 19.
Figure 21:
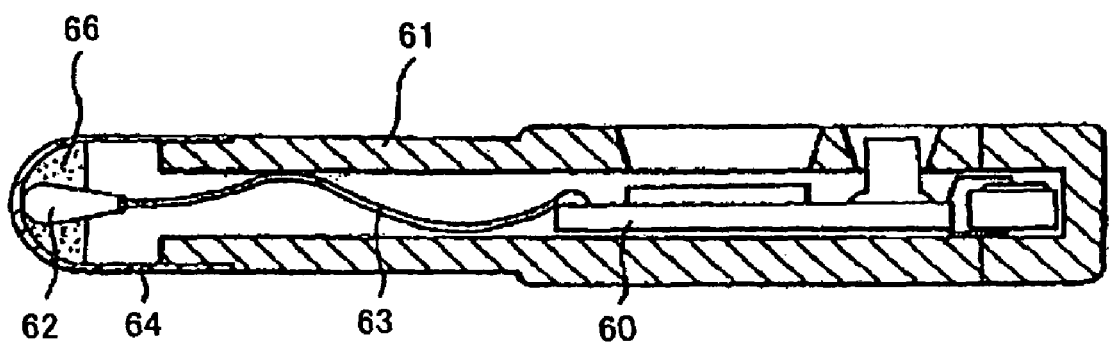
FIG. 21 is a cross sectional view showing further alternative of conventional electronic clinical thermometer.

Next, with reference to FIG. 6 to FIG. 12, a method of producing the electronic clinical thermometer that is shown in FIG. 1 will be explained. FIG. 6 includes illustrations showing a process to connect the lead wire shown in FIG. 5 with the circuit board; FIG. 7 includes illustrations showing a process to incorporate an LCD, an operating switch, and a battery spring within a body case; FIG. 8 includes illustrations showing a process to incorporate the circuit board and insert the lead wire; FIG. 9 is a cross sectional view showing a state in which the sensor cap is filled with an adhesive; FIG. 10 includes illustrations showing a process for mounting the sensor cap; FIG. 13 is an illustration showing a process for mounting a lower case on the body case; and FIG. 14 is a flow chart to explain an assembling process. FIG. 11 includes illustrations to explain an operation of the thermistor that rotationally moves against the inner wall of the sensor cap, and FIG. 12 includes illustrations to explain configuration examples in which the thermistor is made to slide along the inner wall.

Hereinafter, an explanation will be made according to the flow chart as shown in FIG. 14.

Firstly, in step S1 in FIG. 14, the intermediate member 3, the inner case 4, and the outside case 5 are integrally molded as described above.

Figure 5:
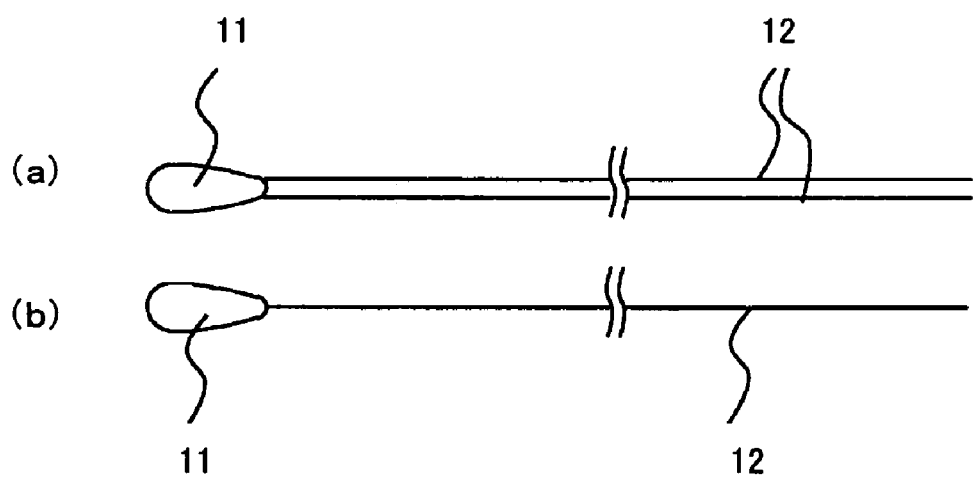
FIG. 5 includes external views of a thermistor as shown in FIG. 1.

In step S2 in FIG. 14, circuit components such as an IC and a chip condenser are implemented on the circuit board 6. In step S3 in FIG. 14, the lead wire 12 is connected to the thermistor 11 as shown in FIG. 5. For example, in this connection step, the lead wire 12 with a part being covered by resin coating excluding the both ends is firstly soldered to the electrodes not illustrated, which are included in the chip shaped device, and next, the chip shaped device is soaked in a layer of molten insulating member made of epoxy resin, and covered by the resin coating.

Figure 6A:
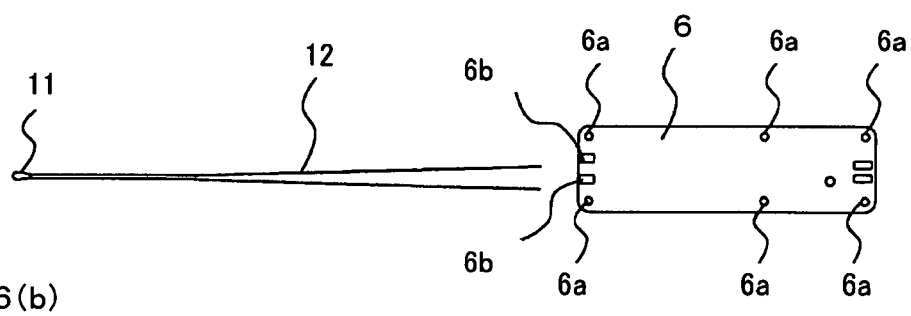
FIG. 6 includes illustrations showing a process to connect the lead wire as shown in FIG. 5 with a circuit board.
Figure 6B:
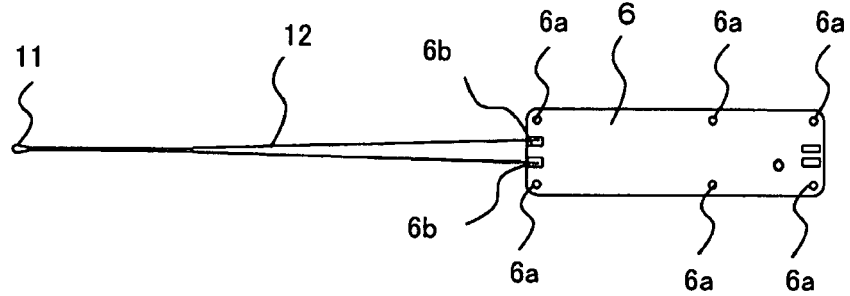

In step S4 in FIG. 14, the lead wire is connected to the circuit board. FIG. 6(a) shows a state where the lead wire has not been connected to the circuit board yet, and FIG. 6(b) shows a state where the lead wire is connected to the circuit board. In step S3, the end of the two lines of lead wire 12 is connected to the thermistor 11, and the other end is in a state of free end. In the condition that one end of the lead wire 12 is being connected to the thermistor 11, the other end is soldered and connected to lead wire connection electrodes 6b in the circuit board 6. In FIG. 6, the circuit board 6 is provided with circuit board installation holes 6a in addition to the lead wire connection electrodes 6b.

In step S5 in FIG. 14, the LCD, the operating switch, and the battery spring are incorporated in the body case.

Figures 7A, 7B:
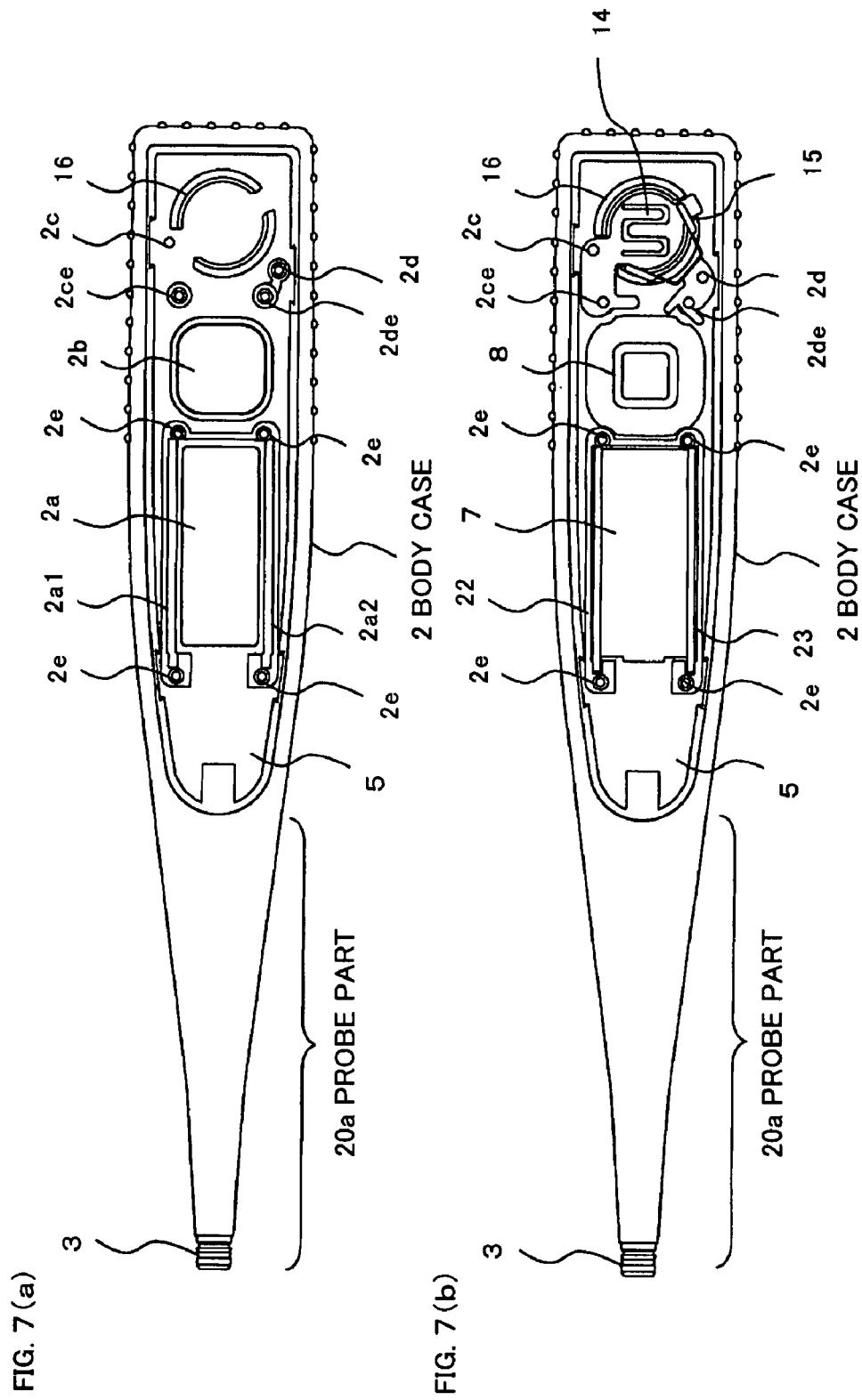
FIG. 7 includes illustrations showing a process to incorporate a liquid crystal display, an operating switch, and a battery spring in a body case.

As shown in FIG. 7(a) and FIG. 7(b), the LCD 7 and the operating switch 8 are respectively incorporated in an LCD built-in hole 2a and an operating switch built-in hole 2b, the holes 2a and 2b being formed on the inner case 4 that constitutes the body case 2.

After the LCD 7 and the operating switch 8 are incorporated, the connector 22 and the spacer 23 are built in predetermined positions as shown in FIG. 7(b). The connector 22 connects a non-illustrated electrode of the LCD 7 and a non-illustrated electrode of the circuit board 6.

Next, columnar convex parts 2ce and 2c for installing a minus spring, which are formed inside of the inner case 4, are inserted into the installation holes provided on the minus spring. Similarly, columnar convex parts 2de and 2d for installing a plus spring, which are formed inside of the inner case 4, are inserted into the installation holes provided on the plus spring.

Subsequent to that, the columnar convex parts 2ce and 2c for installing the minus spring, and the columnar convex parts 2de and 2d for installing the plus spring are crimped respectively. Accordingly, the minus spring 14 and the plus spring 15 are fixed on the inner case 4. On the inner case 4, there are also provided columnar convex parts 2e for installing the board, and a battery holder 16 that holds the side surface of the battery for positioning.

In step S6 in FIG. 14, the thermistor and the circuit board are incorporated, and the lead wire is inserted.

Figure 8A:
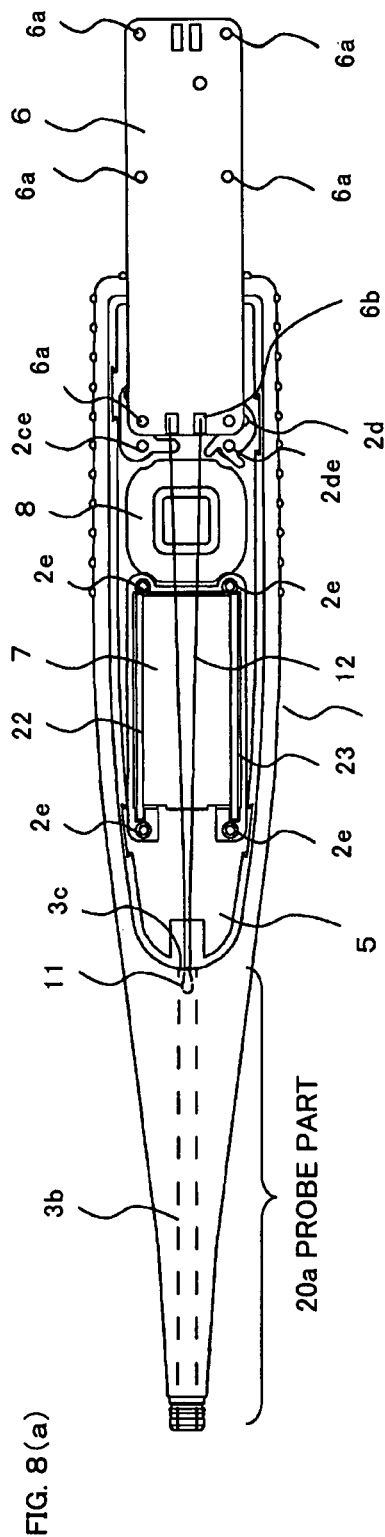
FIG. 8 includes illustrations showing a process to incorporate the circuit board and insert the lead wire.
Figure 8B:
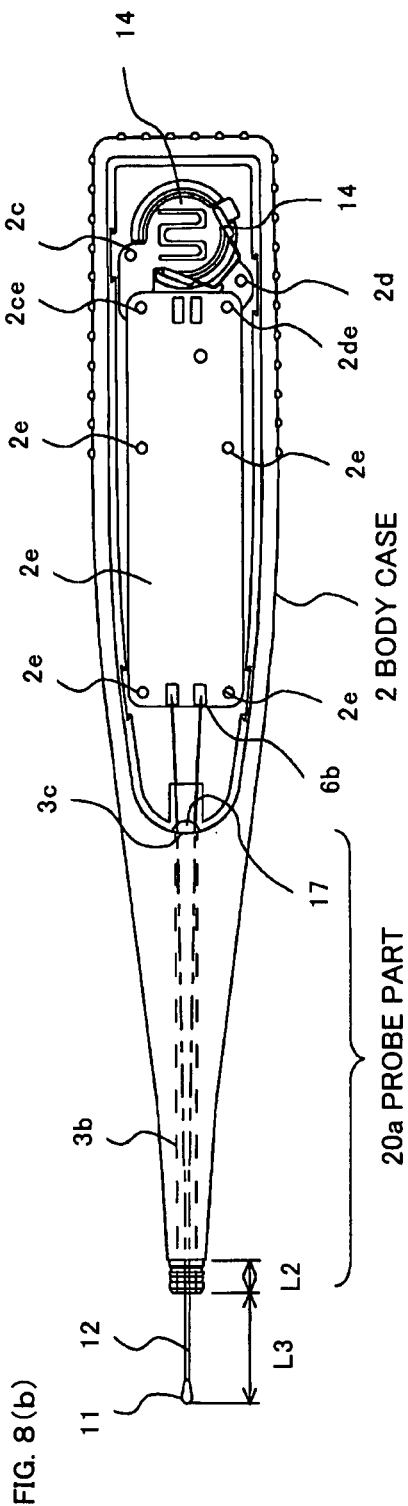
Figure 9:
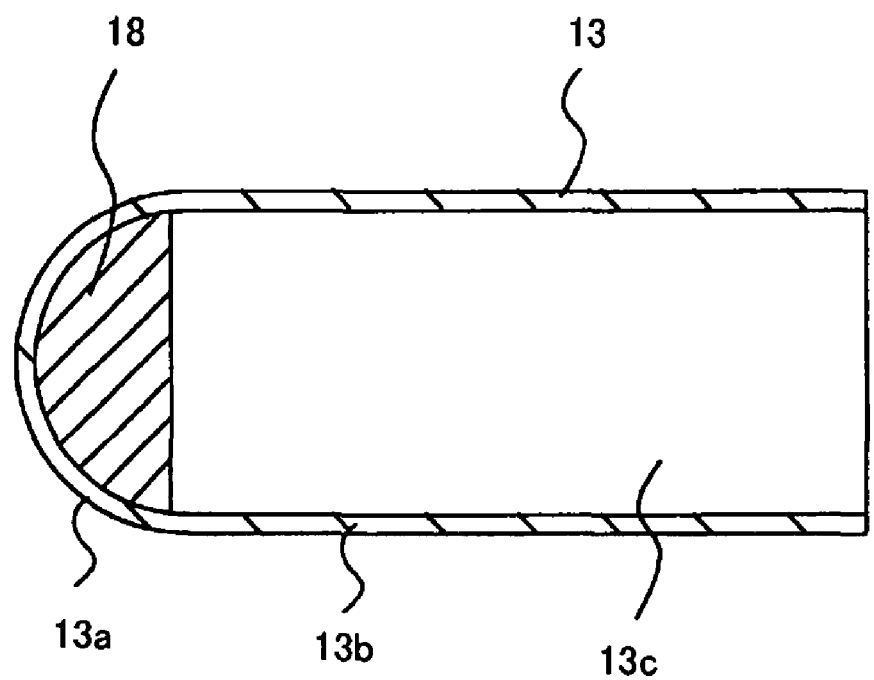
FIG. 9 is a cross sectional view showing a state in which the sensor cap is filled with an adhesive.

FIG. 8(a) shows a state before the thermistor and the circuit board are incorporated, and FIG. 8(b) shows a state after the thermistor and the circuit board are incorporated.

As shown in FIG. 8(a), the tip of the thermistor 11 is inserted from the opening 3c that is provided inside the body case 2.

Subsequently, the circuit board 6 and the lead wire 12 is pushed into and moved towards the probe part 20a. Then, as shown in FIG. 8(b), the thermistor 11 passes through the insertion path 3b and projects from the opening on the tip of the probe part 20a.

As shown in FIG. 8(b), after the circuit board 6 is moved into the body case 2, the columnar convex parts 2e, 2de, and 2ce for installing the board, which are formed on the inner case 4, are inserted into the circuit board installation holes 6a, which are formed on the circuit board 6. FIG. 8 shows six circuit board installation holes 6a, but it may be any number. The columnar convex part for installing the board may be provided in any number corresponding to the number of the circuit board installation hole 6a. The columnar convex part for installing the board is provided on the inner case 4 in accordance with the installing position of the circuit board installation hole 6a. However, it is not necessarily provide the columnar convex part to correspond to all the circuit board installation holes 6a.

The columnar convex parts 2ce and 2de for installing the board may also serve as constitutional elements for installing the minus spring and plus spring, in addition to the function to install the circuit board 6 on the inner case 4.

The columnar convex parts 2e, 2de, and 2ce for installing the board are inserted into the circuit board installation holes 6a, and then, they are crimped to fix the circuit board 6.

Subsequently, the opening 3c of the insertion path 3b in the body case 2 is filled with the adhesive 17 from the circuit board 6 side, and the lead wire 12 is fastened thereto. It is to be noted that the fastening means is not limited to the adhesive, and another means may be applicable.

In FIG. 8(b), as described above, the length L2 indicates a length how long the intermediate member 3 projects. The length L3 indicates the length from the opening of the insertion path 3b on the thermistor 11 side (the tip of the intermediate member) up to the tip of the thermistor 11, and it corresponds to the length how long the thermistor 11 projects from the tip of the probe part 20a.

In FIG. 8 (b), the length of the lead wire 12 is configured as the following. That is, in the state where the lead wire 12 is mounted on the circuit board 6, the tip of the thermistor 11 is configured to project from the opening of the insertion path 3b on the thermistor 11 side (the tip of the intermediate member) only by the length L3.

Here, the length L3 is set to be longer than the aforementioned length L1 of the cavity. This length L3 is set to be a length to the degree that allows the lead wire 12 near the thermistor 11 to buckle as described below and come into contact with the inner wall 13d of the cavity 13c, when the sensor cap 13 is mounted on the probe part 20a.

In step S7 in FIG. 14, the sensor cap is mounted. As shown in FIG. 9, only the hemisphere part 13a of the cavity 13c in the sensor cap 13 is filled with the epoxy adhesive 18, for instance.

Figure 10A:
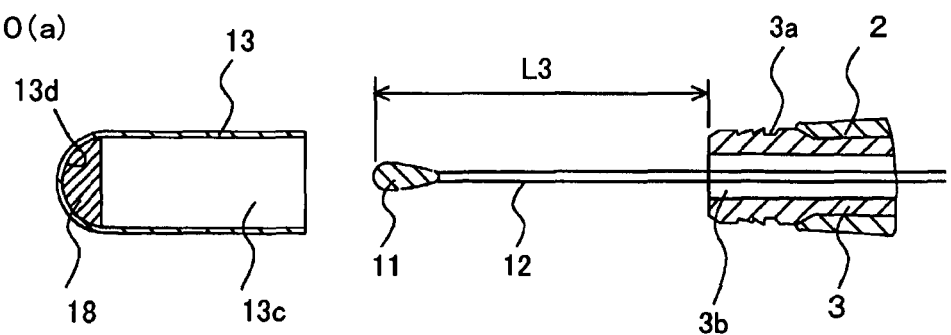
FIG. 10 includes illustrations showing a process for mounting the sensor cap.

Next, as shown in FIG. 10(a), the tip of the thermistor 11 is made to project, by a predetermined length L3, from the tip of the insertion path 3b of the body case 2. The projecting length L3 of the lead wire 9 is set to be a length to the degree that allows the lead wire 9 near the thermistor 8 to come into contact with the inner wall 13d of the cavity 13c, as shown in FIG. 3, by buckling as described below, which occurs when the sensor cap 13 is mounted.

Figure 10B:
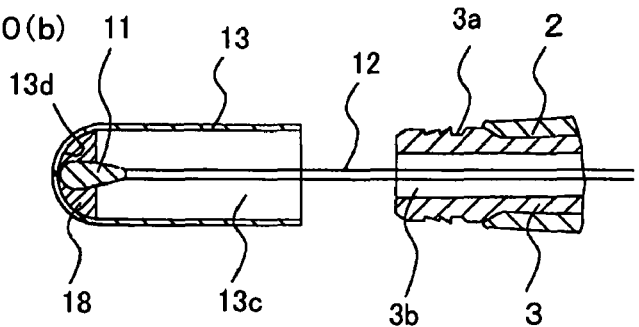

Next, as shown in FIG. 10(b), the sensor cap 13 is adhered to and mounted on the intermediate member 3 that constitutes the probe part 20a, in the state where the thermistor 11 is projecting from the tip of the intermediate member 3. On this occasion, the inner wall 13d on the tip of the sensor cap 13 abuts against the tip of the thermistor 11. Then, the thermistor 11 becomes a rotating end.

Figure 10C:
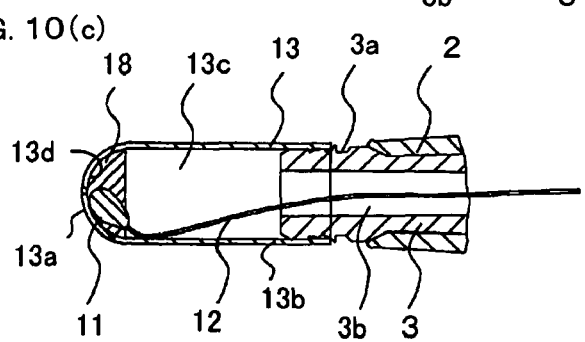

When the sensor cap 13 is further pushed in, one end of the lead wire 12 is fixed on the circuit board 6 and rotational buckling occurs at the other end. In other words, as shown in FIG. 10(c), one end of the lead wire 12 is fastened to the opening 3c of the insertion path 3b on the circuit board 6 side with the adhesive 17 (one end is fixed), as described above. On the other end, the tip of the thermistor 11 abuts against the inner wall 13d of the sensor cap 13 in such a manner as being rotatable (the other end is rotatable).

Therefore, when the sensor cap 13 is pushed in, the lead wire 12 and the thermistor 11 receive a compressed load in a longitudinal direction, and the thermistor 11 is rotated, resulting in that the lead wire 12 near the thermistor 11 is deformed by buckling. Accordingly, the lead wire 12 near the thermistor 11 comes into contact with the inner wall 13d of a hemisphere part 13a of the sensor cap 13.

When the sensor cap 13 is still further pushed in and it reaches a predetermined position where the entire projecting part of the intermediate part 3 is inserted into the sensor cap 13, the thermistor 11 and the lead wire 12 are placed at the position as shown in FIG. 2. The thermistor 11 and the lead wire 12 are fastened to this position with the adhesive 18.

As shown in FIG. 2, the lead wire 12 near the thermistor 11 has a contact/fastened part 12a that comes into contact with and fastened to the inner wall 13d of the cavity 13c, and a non-fastened part 12b that is fastened neither to the sensor cap 13 nor to the probe part 20a, in the portion from the thermistor 11 up to the opening on the intermediate member 3 side of the insertion path 3b, within the cavity 7c formed by the sensor cap 13 and the intermediate member 3.

A portion of the non-fastened part 12b being closer to the contact/fastened part 12a is not fastened with the adhesive 18, but this part is in contact with the inner wall 13d of the cylindrical part 13b in the sensor cap 13.

As described above, as for the lead wire 12 according to the present embodiment, one end of the lead wire 12 is fixed on the end of the insertion path 3b on the circuit board 6 side, and on the other end of the lead wire, the thermistor 11 is rotatable against the inner wall 13d of the sensor cap 13. When the sensor cap 13 is pushed in, the lead wire 12 receives a compressed load in a longitudinal direction, and the thermistor 11 is rotated on the inner wall 13d of the sensor cap 13, whereby the lead wire 12 near the thermistor is deformed with buckling and comes into contact with the inner wall 13d of the hemisphere part 13a of the sensor cap 13.

Next, with reference to FIG. 11, an operation of the thermistor 11 will be explained, which moves rotationally against the inner wall 13d of the sensor cap 13. The electronic clinical thermometer as described above is configured such that the tip of the thermistor 11 has a circular shape, and the inner wall 13d of the sensor cap 13 also has a circular shape, thereby allowing the thermistor 11 to move rotationally.

Various action patterns of this rotational movement can be assumed, which are different depending on a frictional force generated between the thermistor and the inner wall part of the sensor cap, strength of the lead wire, or the like.

FIG. 11 (a) and FIG. 11 (b) each illustrates a situation where the frictional force generated between the thermistor and the inner wall part of the sensor cap is small, and the lead wire has strength at a level being capable of resisting this frictional force.

Figure 11A:
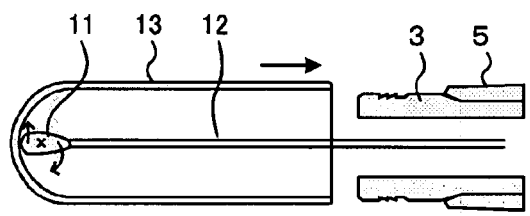
FIG. 11 includes illustrations to explain an operation in which the thermistor moves rotationally against the inner wall of the sensor cap.

In this situation, as shown in FIG. 11(a), a frictional force is generated between the thermistor 11 and the inner wall 13d of the sensor cap 13, when the tip of the thermistor 11 comes into contact with the inner wall 13d of the sensor cap 13. On this occasion, if the lead wire 12 is too weak to resist the frictional force, the lead wire 12 is bent before the thermistor 11 starts sliding. On the other hand, if the lead wire has strength at a level being capable of resisting this frictional force, the thermistor 11 starts sliding along the inner wall 13d before the lead wire is bent (see arrows in FIG. 11(a)).

Figure 11B:
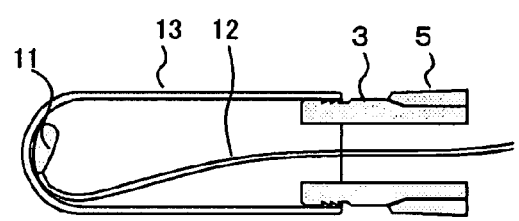

When the thermistor 11 starts sliding along the inner wall 13d, the lead wire 12 is buckled in proximity to the joint part with the thermistor 11 as shown in FIG. 11(b). Due to the buckling of the lead wire 12 in proximity to the joint part with the thermistor 11, the lead wire 12 comes into contact with the inner wall 13d of the sensor cap 13.

Figure 11C:
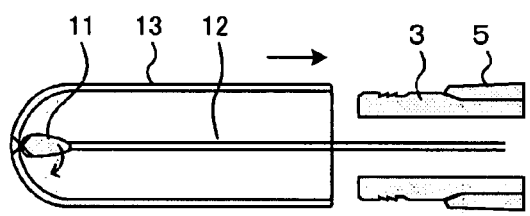
Figure 11D:
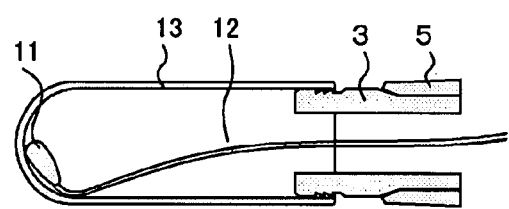

FIG. 11(c) and FIG. 11(d) each illustrates a situation where the frictional force generated between the thermistor and the inner wall part of the sensor cap is large, and the lead wire has strength at a level being capable of resisting this frictional force.

In the situation above, as shown in FIG. 11(c), a frictional force is generated between the thermistor 11 and the inner wall 13d of the sensor cap 13, when the tip of the thermistor 11 comes into contact with the inner wall 13d of the sensor cap 13. If the lead wire has strength at a level being capable of resisting this frictional force, the thermistor 11 moves rotationally with a central focus on the vicinity of the tip thereof, before the lead wire is bent (see the arrow shown in FIG. 11(c)).

When the thermistor 11 moves rotationally with a central focus on the vicinity of the tip thereof, the lead wire 12 is buckled in proximity to the joint part with the thermistor 11 as shown in FIG. 11(d). Due to the buckling of the lead wire 12 in proximity to the joint part with the thermistor 11, the lead wire 12 comes into contact with the inner wall 13d of the sensor cap 13.

In the buckling above, if the lead wire 12 is subjected to plastic deformation, the lead wire 12 is capable of holding the contact with the inner wall 13d by this plastic deformation after it is brought into contact with the inner wall 13d. However, the contact can be maintained with reliability by using the adhesive as described above.

As a configuration to allow the thermistor 11 to slide along the inner wall 13d, there is another example as shown in FIG. 12, in addition to the configurations as shown in FIGS. 11(a) and (b).

Figure 12A:
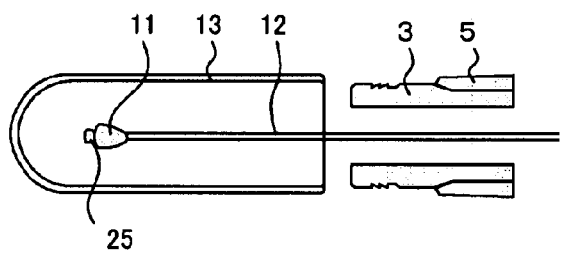
FIG. 12 includes illustrations to explain configuration examples in which the thermistor is made to slide along the inner wall.
Figure 12B:
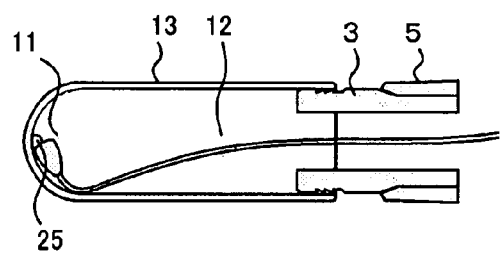
Figure 12C:
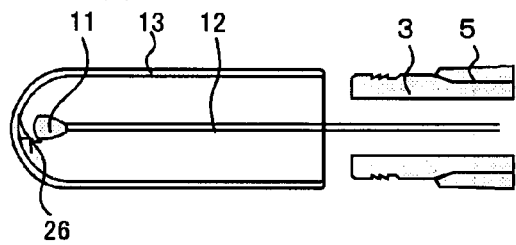
Figure 12D:
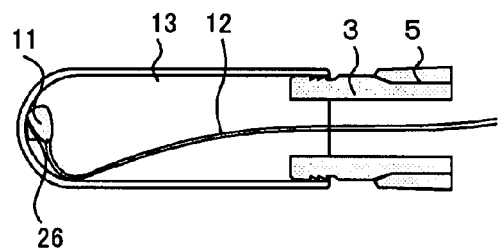

FIGS. 12(a) and (b) each illustrates the first configuration example. In the first configuration example, a thermistor 11 provides a protrusion 25 at a position where the tip of thermistor 11 abuts against the inner wall 13d of the sensor cap 13. The protrusion 25 has an almost hemispherical shape or an almost half-oval-spherical shape, and the frictional coefficient is set to be small.

When the tip of the thermistor 11 comes into contact with the protrusion 25, a slight displacement between the central axes of the thermistor and the protrusion enlarges a directional component for allowing the thermistor 11 to slide, the component being generated by a pressing force from the thermistor 11, whereby the sliding is facilitated.

After the thermistor 11 comes into contact with the protrusion 25 and slides, the lead wire 12 is buckled and the lead wire 12 comes into contact with the inner part 13d of the sensor cap 13, in the similar manner as shown in FIG. 11(b).

FIGS. 12 (c) and (d) each illustrates a second configuration example. In the second configuration example, an inclined surface 26 is provided at a position where the tip of thermistor 11 abuts against the inner wall 13d of the sensor cap 13.

When the tip of the thermistor 11 comes into contact with the inclined surface 26, a directional component for allowing the thermistor 11 to slide is enlarged, the component being generated by a pressing force from the thermistor 11, whereby the sliding is facilitated.

After the thermistor 11 comes into contact with the inclined surface 26 and slides, the lead wire 12 is buckled and the lead wire 12 comes into contact with the inner part 13d of the sensor cap 13, in the similar manner as shown in FIG. 11(b).

Figure 12E:
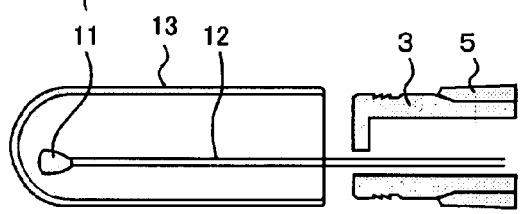
Figure 12F:
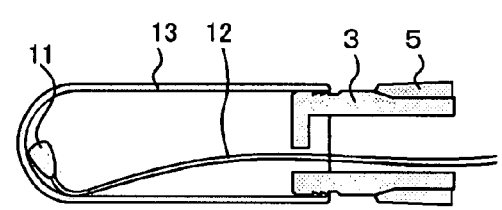

FIGS. 12(e) and (f) each illustrates a third configuration example. In the third configuration example, a position of the central axis of the lead wire 12 is displaced from a position of the central axis of the sensor cap 13. This position of the central axis of the lead wire 12 can be displaced by a displacement of the center location of the opening of the intermediate member 3 on the sensor cap side.

In the state where the central axis of the lead wire 12 and the central axis of the thermistor 11 are displaced, the tip of the lead wire 12 comes into contact with an inclined surface of the inner wall 13d in the sensor cap 13. Accordingly, a directional component for allowing the thermistor 11 to slide is enlarged, the component being generated by a pressing force from the thermistor 11, whereby the sliding is facilitated.

After the thermistor 11 comes into contact with the inner wall 13d and slides, the lead wire 12 is buckled and the lead wire 12 comes into contact with the inner part 13d of the sensor cap 13, in the similar manner as shown in FIG. 11(b).

Figure 12G:
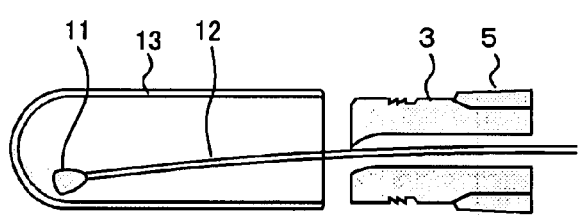
Figure 12H:
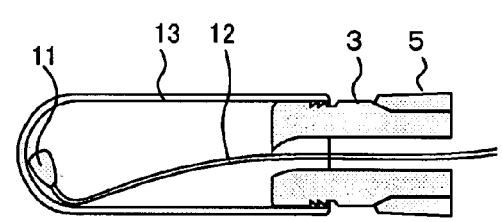

FIGS. 12(g) and (h) each illustrates a fourth configuration example. In the fourth configuration example, a projecting direction of the lead wire 12 is displaced from a position of the central axis of the sensor cap 13, when the lead wire 12 projects from the opening of the intermediate member 3 on the sensor cap 13 side. The projecting direction of the lead wire 12 can be set by a shape of the opening of the intermediate member 3 on the sensor cap side.

When the projecting direction of the lead wire 12 is displaced from the position of the central axis of the sensor cap 13, the tip of the lead wire 12 comes into contact with the inclined surface of the inner wall 13d of the sensor cap 13. Accordingly, a directional component for allowing the thermistor 11 to slide is enlarged, the component being generated by a pressing force from the thermistor 11, whereby the sliding is facilitated.

After the thermistor 11 comes into contact with the inner wall 13d and slides, the lead wire 12 is buckled and the lead wire 12 comes into contact with the inner part 13d of the sensor cap 13, in the similar manner as shown in FIG. 11(b).

In step S8 in FIG. 14, a lower case is mounted. In this step S8, a buzzer 22 is mounted on the lower case 9 made of hard resin such as ABS resins, and the buzzer 24 and the circuit board 6 are connected with each other via lead wire, not illustrated. Subsequently, as shown in FIG. 13, the lower case is mounted on the backside of the body case 2 with an adhesive or the like.

Then, a battery is stored in step S9 in FIG. 14, a battery cover 10 is mounted in step S10 in FIG. 14, and the assembling process is completed.

Next, an operation and an effect of the method for producing the electronic clinical thermometer having the above configuration, in particular, a contact between the lead wire and the sensor cap will be explained.

One end of the lead wire 12 being connected the thermistor 11 is fixed, and the other end thereof is in rotating state. As described above, the projecting length L3 from the intermediate member 3 to the tip of the thermistor 11 is set to be longer than the length L1 from the intermediate member 3 to the inner wall 13d of the sensor cap 13. Therefore, the lead wire 12 near the thermistor 11 is allowed to come into contact with the inner wall 13d of the almost hemisphere or almost half-oval-sphere part 13a of the cavity 13c in the sensor cap 13.

With this configuration, the thermistor 11 and the lead wire 12 near the thermistor 11 rise in temperature to the same level as the temperature of the inner wall 13d of the sensor cap 13. Therefore, there is no difference in temperature between the thermistor 11 and the lead wire 12, thereby preventing heat dissipation from the thermistor 11 to the lead wire 12, effectively. Accordingly, the time for measuring body temperature can be reduced.

Only the hemisphere part 13a of the cavity 13c in the sensor cap 13 is filled with the epoxy adhesive 18. The thermistor 11 and the lead wire 12 are bonded together only at an area on which the adhesion is necessary, and the remaining area is not filled with the adhesive. Therefore, it is possible to suppress the increase of heat capacity caused by unnecessary adhesive, thereby reducing the heat capacity of the sensor cap 13.

Only the lead wire 12 near the thermistor 11 is fastened and the remaining portion can be configured as a non-fastened part. Therefore, it is not necessary to use a conventional producing method such as squeezing a heat insulator into the sensor cap, which may cause that the heat insulator pulls the lead wire therein. Accordingly, an excessive load on the lead wire is eliminated, and a break of the lead wire can be prevented.

The thermistor 11 is fastened to the inner wall of the cavity 13c of the sensor cap 13 being in contact therewith, whereby heat is preferably transferred from the sensor cap 13 to the thermistor 11.

Since the thermistor 11 is mounted on the tip of the lead wire 12 projecting from the insertion path 3b, a path for emitting heat that is transferred from the thermistor 11 to the lead wire 12, is limited to only one route, and it is possible to effectively prevent dissipation of heat from the thermistor 11 to the lead wire 12.

In addition, the thermistor 11 is disposed at the hemisphere part 13a that is formed in almost hemispherical shape or almost half-oval-spherical shape on the tip of the sensor cap 13, and the lead wire 12 near the thermistor 11 is brought into contact with the inner wall 13d of this hemisphere part 13a, and fastened thereto. Accordingly, the hemisphere part 13a formed in almost hemispherical shape or almost half-oval-spherical shape on the tip of the sensor cap 13 is provided with a portion to store the adhesive, thereby facilitating a filling of the adhesive to bond the thermistor 11 and the lead wire 12 in the vicinity thereof.

In the process to fill the area near the closed end in the sensor cap 13 with the adhesive 18, the thermistor 11 and the lead wire 12 can be fastened to the area near the closed end of the sensor cap 13, as well as reinforcing the tip of the sensor cap 13.

The process to fill the area near the closed end in the sensor cap 13 with the adhesive is carried out before mounting the sensor cap 13 on the probe part 20a, whereby filling of the adhesive 18 can be performed before placing the thermistor 11 and the lead wire 12 in the sensor cap 13. Therefore, filling with the adhesive 18 is facilitated.

In the process to mount the sensor cap 13 on the probe part 20a, the inner wall 13d of the closed end of the cavity 13c in the sensor cap 13 is pushed against the thermistor 11 and the thermistor 11 is moved rotationally. With this configuration, buckling occurs on the lead wire 12 near the thermistor 11, and the lead wire can be easily deformed to come into contact with the inner wall of the sensor cap 13.

The cavity 13c in the sensor cap 13 is formed in such a manner that a part of the inner wall 13d of the sensor cap 13 has an almost hemispherical shape or an almost half-oval-spherical shape, to which the lead wire 12 near the thermistor 11, being circularly curved by buckling, is brought into contact. Since this part has a shape similar to the shape of the lead wire circularly curved by buckling, the lead wire 12 near the thermistor 11 can easily come into contact with the inner wall 13d.

In the process as shown in FIG. 6 to FIG. 14, there is shown a procedure to incorporate the circuit board 6 into the body case 2 after the lead wire 12 is connected to the circuit board 6. However, another procedure may be possible such as previously incorporating the circuit board 6 into the body case 2, and then connecting the lead wire 12 to the circuit board 6.

In other words, it is possible to firstly perform the step to mount the circuit board 6 on the body case 2, and then perform the step to pull the thermistor 11 and the lead wire 12 out of the opening of the insertion path 3b of the probe part 20a. In this case, for instance, the following procedure may be applicable in FIG. 8(b): the circuit board 6 is incorporated in the body case 2 in the state where the lead wire 12 has not been connected to the circuit board 6 yet. Subsequently, the end of the lead wire 12 on the opposite side of the end to which the thermistor 11 is connected, is inserted from the opening on the intermediate member 3 side of the insertion path 3b, and the lead wire 12 is pulled out of the opening 3c on the circuit board 6 side to be connected with the lead wire connection electrodes 6b on the circuit board 6.

In the example above, it is shown that the sensor cap is attached to the probe, after the thermistor and the lead wire are mounted on the probe part. However, it is further possible that firstly the sensor cap is mounted on the tip of the probe, and subsequently the thermistor and the lead wire are mounted on the probe part.

As is apparent from the aforementioned descriptions, according to the embodiment of the method of producing the electronic clinical thermometer of the present invention, it is possible to produce the electronic clinical thermometer without a break of the lead wire, as well as effectively preventing dissipation of heat from the thermistor to the lead wire.

In addition, according to the embodiment of the electronic clinical thermometer of the present invention, the lead wire near the thermistor is fastened to the inner wall of the sensor cap with an adhesive, in such a manner that the lead wire is brought into contact with the inner wall and a remaining part is freely movable, thereby achieving a production without a break of the lead wire and preventing dissipation of heat from the thermistor to the lead wire. In addition, it is further possible to provide the electronic clinical thermometer that is capable of measuring a body temperature at high speed.

INDUSTRIAL APPLICABILITY

A technique disclosed by the present application can be applied to a configuration in which a sensor is mounted onto a contact member.

What is claimed is:

1. A method of producing an electronic clinical thermometer that comprises a temperature-sensitive element, lead wire that is connected to the temperature-sensitive element, a body case having a probe part in which an insertion path for the lead wire to be inserted is formed, and a sensor cap having a cavity one end of which is opened to the body and the other end is closed, both the lead wire projecting from the insertion path and the temperature-sensitive element being stored within the sensor cap, the method comprising:

mounting the sensor cap on the probe part, in a state where the lead wire having the temperature-sensitive element mounted on the tip thereof projects from the insertion path of the probe part, said mounting the sensor cap on the probe part comprises the steps of:

setting a projecting length of the lead wire so that the projecting length is longer than a distance between a tip of the probe part and a tip of an inner wall of the cavity, when the sensor cap is mounted on the probe part and applying a pressing force to the sensor cap to cause the temperature-sensitive element to rotate which causes the lead wire, which is straight, to deform in proximity to the temperature-sensitive element by buckling so that the lead wire in deformed state comes into contact with an inner wall of the cavity near the temperature-sensitive element.

2. The method of producing the electronic clinical thermometer according to claim 1, wherein, the projecting length of the lead wire has a length to a degree that allows the lead wire near the temperature-sensitive element to come into contact with the inner wall of the cavity.

3. The method of producing the electronic clinical thermometer according to claim 1 or claim 2, the electronic clinical thermometer further comprising a circuit board, the method comprising, a temperature-sensitive element mounting step that mounts the temperature-sensitive element on the lead wire, a connecting step that connects the lead wire with the circuit board, and an incorporating step that incorporates the circuit board into the body case, wherein, the temperature-sensitive element mounting step, the connecting step, and the incorporating step are carried out in order, alternatively in reverse order.

4. The method of producing the electronic clinical thermometer according to claim 1 or claim 2, wherein, in the sensor cap mounting step that mounts the sensor cap on the probe part, the temperature-sensitive element is moved rotationally, when the inner wall of the end being closed of the cavity is pressed against the temperature-sensitive element.

5. The method of producing the electronic clinical thermometer according to claim 1 or claim 2, wherein, the sensor cap mounting step that mounts the sensor cap on the probe part is carried out in a state where at least a part of the lead wire other than the projecting part thereof is fixed.

6. The method of producing the electronic clinical thermometer according to claim 1 or claim 2, wherein, the tip of the cavity is formed in an almost hemispherical shape or in an almost half-oval-spherical shape, against which the temperature-sensitive element abuts.

7. The method of producing the electronic clinical thermometer according to claim 1, further comprising, an adhesive filling step that fills an area near the end, which is closed, in the sensor cap with an adhesive.

8. The method of producing the electronic clinical thermometer according to claim 7, wherein, the adhesive filling step is carried out before the sensor cap is mounted on the probe part.

9. The method of producing the electronic clinical thermometer according to claim 7 or claim 8, wherein, in the adhesive filling step, an amount of the adhesive used for the filling corresponds to the amount being required for fastening only the temperature-sensitive element and the lead wire near the temperature-sensitive element.

* * * * *